United States Patent
Torabi et al.

(10) Patent No.: US 11,409,791 B2
(45) Date of Patent: Aug. 9, 2022

(54) JOINT HETEROGENEOUS LANGUAGE-VISION EMBEDDINGS FOR VIDEO TAGGING AND SEARCH

(71) Applicant: Disney Enterprises, Inc., Burbank, CA (US)

(72) Inventors: Atousa Torabi, Pittsburgh, PA (US); Leonid Sigal, Pittsburgh, PA (US)

(73) Assignee: Disney Enterprises, Inc., Burbank, CA (US)

( * ) Notice: Subject to any disclaimer, the term of this patent is extended or adjusted under 35 U.S.C. 154(b) by 504 days.

(21) Appl. No.: 15/620,232

(22) Filed: Jun. 12, 2017

(65) Prior Publication Data
US 2017/0357720 A1 Dec. 14, 2017

Related U.S. Application Data

(60) Provisional application No. 62/348,470, filed on Jun. 10, 2016.

(51) Int. Cl.
| | |
|---|---|
| *G06F 16/638* | (2019.01) |
| *G06N 3/08* | (2006.01) |
| *G06N 3/04* | (2006.01) |
| *H04N 21/8405* | (2011.01) |
| *G06F 16/783* | (2019.01) |
| *G06V 20/40* | (2022.01) |

(52) U.S. Cl.
CPC ........ *G06F 16/638* (2019.01); *G06F 16/7844* (2019.01); *G06N 3/0445* (2013.01); *G06N 3/0454* (2013.01); *G06N 3/08* (2013.01); *G06N 3/084* (2013.01); *G06V 20/41* (2022.01); *H04N 21/8405* (2013.01)

(58) Field of Classification Search
CPC .... G06F 16/71; G06F 16/638; G06F 16/7844; G06N 3/084; G06N 3/0454; G06N 3/0445; G06N 3/08; G06K 9/00718
See application file for complete search history.

(56) References Cited

U.S. PATENT DOCUMENTS

| | | | |
|---|---|---|---|
| 5,485,554 | A | 1/1996 | Lowitz et al. |
| 5,880,788 | A | 3/1999 | Bregler |
| 6,173,317 | B1 | 1/2001 | Chaddha et al. |

(Continued)

OTHER PUBLICATIONS

Britz, Recurrent Neural Network Tutorial, Part 4, Oct. 27, 2015. (Year: 2015).*

(Continued)

*Primary Examiner* — Brittany N Allen
(74) *Attorney, Agent, or Firm* — Patterson + Sheridan, LLP

(57) ABSTRACT

Systems, methods and articles of manufacture for modeling a joint language-visual space. A textual query to be evaluated relative to a video library is received from a requesting entity. The video library contains a plurality of instances of video content. One or more instances of video content from the video library that correspond to the textual query are determined, by analyzing the textual query using a data model that includes a soft-attention neural network module that is jointly trained with a language Long Short-term Memory (LSTM) neural network module and a video LSTM neural network module. At least an indication of the one or more instances of video content is returned to the requesting entity.

20 Claims, 8 Drawing Sheets

(56) References Cited

U.S. PATENT DOCUMENTS

| | | |
|---|---|---|
| 6,654,930 B1 | 11/2003 | Zhou et al. |
| 6,751,339 B1 | 6/2004 | Windle et al. |
| 6,912,688 B1 | 6/2005 | Zhou et al. |
| 7,343,617 B1 | 3/2008 | Katcher et al. |
| 8,438,595 B1 | 5/2013 | Kannan |
| 8,447,604 B1 | 5/2013 | Chang |
| 8,531,473 B2 | 9/2013 | Tzur et al. |
| 8,554,558 B2 | 10/2013 | McCarley et al. |
| 9,208,179 B1* | 12/2015 | Song ................... G06F 16/20 |
| 9,792,534 B2* | 10/2017 | Wang .................... G06N 3/08 |
| 9,812,028 B1 | 11/2017 | Elchik et al. |
| 9,965,705 B2* | 5/2018 | Chen .................... G06N 5/04 |
| 10,224,057 B1 | 3/2019 | Chevrier |
| 10,366,166 B2 | 7/2019 | Yu et al. |
| 10,504,010 B2* | 12/2019 | Mao ................. G06N 3/0454 |
| 10,558,750 B2 | 2/2020 | Lu et al. |
| 10,599,769 B2 | 3/2020 | Osbourne et al. |
| 10,733,980 B2 | 8/2020 | Kotri et al. |
| 10,776,408 B2 | 9/2020 | Altaf et al. |
| 10,789,288 B1 | 9/2020 | Ranzinger |
| 10,817,732 B2 | 10/2020 | Porter et al. |
| 10,823,572 B2 | 11/2020 | Huang et al. |
| 10,832,034 B2 | 11/2020 | Liu et al. |
| 10,832,436 B2 | 11/2020 | Lam et al. |
| 10,909,329 B2* | 2/2021 | Gao .................... G06F 40/56 |
| 2002/0078446 A1 | 6/2002 | Dakss et al. |
| 2002/0088009 A1 | 7/2002 | Dukiewicz et al. |
| 2002/0093591 A1 | 7/2002 | Gong et al. |
| 2003/0076334 A1 | 4/2003 | Dumitras et al. |
| 2003/0190147 A1 | 10/2003 | Lee |
| 2003/0190148 A1 | 10/2003 | Lee |
| 2003/0218696 A1 | 11/2003 | Bagga et al. |
| 2004/0051783 A1 | 3/2004 | Chellappa et al. |
| 2004/0125877 A1 | 7/2004 | Chang et al. |
| 2007/0219945 A1* | 9/2007 | Wang ................. G06F 17/272 |
| 2008/0086754 A1 | 4/2008 | Chen et al. |
| 2008/0090553 A1 | 4/2008 | Wan et al. |
| 2008/0295040 A1 | 11/2008 | Crinon |
| 2010/0007665 A1 | 1/2010 | Smith et al. |
| 2010/0104184 A1 | 4/2010 | Bronstein et al. |
| 2010/0299131 A1 | 11/2010 | Lanham et al. |
| 2010/0332214 A1 | 12/2010 | Shpalter et al. |
| 2011/0054901 A1 | 3/2011 | Qin et al. |
| 2012/0075490 A1 | 3/2012 | Tsai et al. |
| 2012/0078691 A1 | 3/2012 | Tsai et al. |
| 2012/0078712 A1 | 3/2012 | Fontana et al. |
| 2012/0079380 A1 | 3/2012 | Tsai et al. |
| 2012/0113229 A1 | 5/2012 | Hassebrook et al. |
| 2012/0192227 A1 | 7/2012 | Fleischman et al. |
| 2012/0206567 A1 | 8/2012 | Zafarifar et al. |
| 2012/0215903 A1 | 8/2012 | Fleischman et al. |
| 2012/0331066 A1 | 12/2012 | FitzGerald |
| 2013/0067333 A1 | 3/2013 | Brenneman |
| 2013/0071085 A1 | 3/2013 | Ryman et al. |
| 2014/0039871 A1 | 2/2014 | Crawford |
| 2015/0234919 A1 | 8/2015 | Baker et al. |
| 2015/0296228 A1 | 10/2015 | Chen et al. |
| 2015/0312652 A1 | 10/2015 | Baker et al. |
| 2016/0014482 A1 | 1/2016 | Chen et al. |
| 2016/0342895 A1* | 11/2016 | Gao .................... G06N 5/04 |
| 2017/0083623 A1* | 3/2017 | Habibian ............ G06F 16/334 |
| 2017/0127016 A1* | 5/2017 | Yu ...................... G06K 9/00711 |
| 2017/0150235 A1* | 5/2017 | Mei .................... H04N 21/8405 |
| 2017/0213469 A1 | 7/2017 | Elchik et al. |
| 2017/0289589 A1* | 10/2017 | Koumchatzky ...... G06N 3/0454 |
| 2017/0293638 A1* | 10/2017 | He ...................... G06F 16/5846 |
| 2017/0329395 A1 | 11/2017 | Flordal |
| 2017/0357720 A1 | 12/2017 | Torabi et al. |
| 2018/0061256 A1 | 3/2018 | Elchik et al. |
| 2018/0124331 A1 | 5/2018 | Min et al. |
| 2018/0160200 A1 | 6/2018 | Goel et al. |
| 2018/0204111 A1 | 7/2018 | Zadeh et al. |
| 2018/0285456 A1 | 10/2018 | Nichkawde |
| 2019/0058886 A1 | 2/2019 | Chen et al. |
| 2019/0080697 A1 | 3/2019 | Grancharov et al. |
| 2019/0130187 A1 | 5/2019 | Hu et al. |
| 2019/0147224 A1 | 5/2019 | Li et al. |
| 2020/0012725 A1 | 1/2020 | Li et al. |

OTHER PUBLICATIONS

Venugopalan et al., "Translating Videos to Natural Language Using Deep Recurrent Neural Networks", Jun. 5, 2015 (Year: 2015).*

Hochreiter et al., Long Short-term Memory, Neural Computation, 1997 (Year: 1997).*

Song et al., Hierarchical LSTMs with Adaptive Attention for Video Captioning, Aug. 2015 (Year: 2015).*

Yao, describing videos by exploiting temporal structure, Oct. 2015 (Year: 2015).*

Donahue, Long-term Recurrent Convolutional Networks for Visual Recognition and Description, May 2016 (Year: 2016).*

Li et al., Visual to Text Survey of Image and Video captioning, Aug. 2019 (Year: 2019).*

Xu et al., "Learning Multimodal Attention LSTM Networks for Video Captioning", MM '17: Proceedings of the 25th ACM international conference on MultimediaOctober 2017 pp. 537-545 https://doi.org/10.1145/3123266.3123448 (Year: 2017).*

Pan et al., "Hierarchical Recurrent Neural Encoder for Video Representation with Application to Captioning", 2016 IEEE Conference on Computer Vision and Pattern Recognition (Year: 2016).*

Bahdanau, D., Cho, K., & Bengio, Y. (2015). Neural Machine Translation by Jointly Learning to Align and Translate. CoRR, abs/1409.0473. (Year: 2015).*

Vinyals, Oriol & Toshev, Alexander & Bengio, Samy & Erhan, Dumitru. (2015). Show and tell: A neural image caption generator. 3156-3164. 10.1109/CVPR.2015.7298935. (Year: 2015).*

Yao, L., Torabi, A., Cho, K., Ballas, N., Pal, C., Larochelle, H. and Courville, A., 2015. Video description generation incorporating spatio-temporal features and a soft-attention mechanism. (Year: 2015).*

Zanfir, M., Marinoiu, E. and Sminchisescu, C., Nov. 2016, Spatio-temporal attention models for grounded video captioning. In asian conference on computer vision (pp. 104-119). Springer, Cham. (Year: 2016).*

Vendrov, Ivan & Kiros, Ryan & Fidler, Sanja & Urtasun, Raquel. (2015). Order-Embeddings of Images and Language. (Year: 2015).*

Agrawal, Harsh, et al. "Sort story: Sorting jumbled images and captions into stories." arXiv preprint arXiv:1606.07493 (2016). (Year: 2016).*

Ran Xu, Caiming Xiong, Wei Chen, and Jason J. Corso. 2015. Jointly modeling deep video and compositional text to bridge vision and language in a unified framework. In Proceedings of the Twenty-Ninth AAAI Conference on Artificial Intelligence (AAAI15). AAAI Press, 2346-2352. (Year: 2015).*

P. Sankar, C. Jawahar, and A. Zisserman. Subtitle-free movie to script alignment In Proc. Brit. Mach. Vis. Conf., pp. 121-1, 2009.

Y. Zhu, R. Kiras, R. Zemel, R. Salakhutdinov, R. Urtasun, A. Torralba, and S. Fidler. Aligning books and movies: Towards story-like visual explanations by watching movies and reading books. In ICCV, pp. 19-27, 2015.

M. Tapaswi, M. Bauml, and R. Stiefelhagen. Book2movie: Aligning video scenes with book chapters. In CVPR, pp. 1827-1835, 2015.

P. Dogan, M. Gross, and J.-C. Bazin. Label-based automatic alignment of video with narrative sentences. In ECCV Workshops, pp. 605-620, 2016.

T. Cour, C. Jordan, E. Miltsakaki, and B. Taskar. Movie/script: Alignment and parsing of video and text transcription. ECCV, pp. 158-171, 2008.

P. Bojanowski, R. Lajugie, E. Grave, F. Bach, I. Laptev, J. Ponce, and C. Schmid. Weaklysupervised alignment of video with text In ICCV, pp. 4462-4470, 2015.

M. Tapaswi, M. Bauml, and R. Stiefelhagen. Story-based video retrieval in tv series using plot synopses. In International Conference on Multimedia Retrieval, p. 137. ACM, 2014.

(56) References Cited

OTHER PUBLICATIONS

U.S. Appl. No. 16/028,183 "Alignment of Video and Textual Sequences for Metadata Analysis," as filed on Jul. 5, 2018.

* cited by examiner

JOINT HETEROGENEOUS LANGUAGE-VISION EMBEDDINGS FOR VIDEO TAGGING AND SEARCH

CROSS-REFERENCE TO RELATED APPLICATIONS

This application claims benefit of U.S. provisional patent application Ser. No. 62/348,470 filed Jun. 10, 2016 which is herein incorporated by reference in its entirety.

BACKGROUND

Field of the Invention

Embodiments described herein generally relate to classifying video content, and more particularly, to techniques for tagging video content using a joint language-visual embedding space.

Description of the Related Art

A number of different techniques exist today for delivering video content to users. Generally speaking, existing systems for delivering video content, such as over-the-air broadcasts, cable television service, Internet television service, telephone network television service, satellite television service, satellite radio service, websites, etc., provide a relatively impersonalized, generic experience to all viewers. For example, with respect to broadcast television, all viewers of a given television network station receive essentially the same content in essentially the same order.

Moreover, the amount of digital video content that is available for users to consume is growing at an ever-increasing pace. For example, online platforms exist today that enables users to upload original content for distribution to other users. These platforms, together with the advent of inexpensive mobile recording devices (e.g., smart phones), have led to a significant increase in the amount of digital video content available for consumption.

Natural language-based video and image search has been a long standing topic of research among information retrieval, multimedia, and computer vision communities. Several existing on-line platforms rely on massive human curation efforts, manually assigned tags, click counts and surrounding text to match largely unstructured search phrases, in order to retrieve ranked list of relevant videos from a stored library. However, as the amount of unlabeled digital video content grows, the focus is rapidly shifting to automated understand, tagging and search.

One technique for automating the tagging of digital video content is through the use of image-based objection detection. Traditional image-based object detection systems identify objects in a video using a model trained on a source domain of images. Doing so allows the detection system to, e.g., localize an object and determine its bounding box for further use. The image-based model also allows the object detection system to distinguish object from one another and to classify objects into predefined types. However, systems that use image-based detection models often fail to generalize examples falling in a source (training) domain of images to the target (test) domain of videos. An object detection system trained on one set of image data often fails to accurately detect objects of other data sets.

To address this issue, some image-based object detection systems perform domain adaptation. An example domain adaptation approach involves transferring learned information (e.g., labeled sample images) from the source domain to the target domain. However, a target domain of objects (e.g., in videos) may constantly evolve object appearance and lighting changes. Further, as the object detection system adapts to a new target domain, the system disregards information learned from the previous target domain. Thus, if given the previous target domain, the object detection system has to again adapt to that domain.

SUMMARY

One embodiment provides a method that includes receiving, from a requesting entity, a textual query to be evaluated relative to a video library, the video library containing a plurality of instances of video content. The method includes determining one or more instances of video content from the video library that correspond to the textual query, by analyzing the textual query using a data model that includes a soft-attention neural network module that is jointly trained with a language Long Short-term Memory (LSTM) neural network module and a video LSTM neural network module. Additionally, the method includes returning at least an indication of the one or more instances of video content to the requesting entity.

Another embodiment provides a method that includes receiving, from a requesting entity, a textual query to be evaluated relative to a video library, the video library containing a plurality of instances of video content. The method includes training a data model based on a plurality of training samples, where each of the plurality of training samples includes (i) a respective instance of video content and (ii) a respective plurality of phrases describing the instance of video content, and where training the data model further comprises, for each of the plurality of training samples, encoding each of the plurality of phrases for the training sample as a matrix, wherein each word within the one or more phrases is encoded as a vector, determining a weighted ranking between the plurality of phrases, encoding the instance of video content for the training sample as a sequence of frames, extracting frame features from the sequence of frames, performing an object classification analysis on the extracted frame features, and generating a matrix representing the instance of video content, based on the extracted frame features and the object classification analysis. Additionally, the method includes processing the textual query using the trained data model to identify one or more instances of video content from the plurality of instances of video content, and returning at least an indication of the one or more instances of video content to the requesting entity.

Yet another embodiment provides a method that includes training a data model based in part on a plurality of training samples, where each of the plurality of training samples includes (i) a respective instance of video content and (ii) a respective plurality of phrases describing the instance of video content, where a first one of the plurality of training samples comprises a single frame instance of video content generated from an image file, and where training the data model further comprises, for each of the plurality of training samples, determining a weighted ranking between the plurality of phrases, based on a respective length of each phrase, such that more lengthy phrases are ranked above less lengthy phrases, and generating a matrix representing the instance of video content, based at least in part on an object classification analysis performed on frame features extracted from the instance of video content. Additionally, the method includes using the trained data model to identify one or more instances of video content that are related to a textual query.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
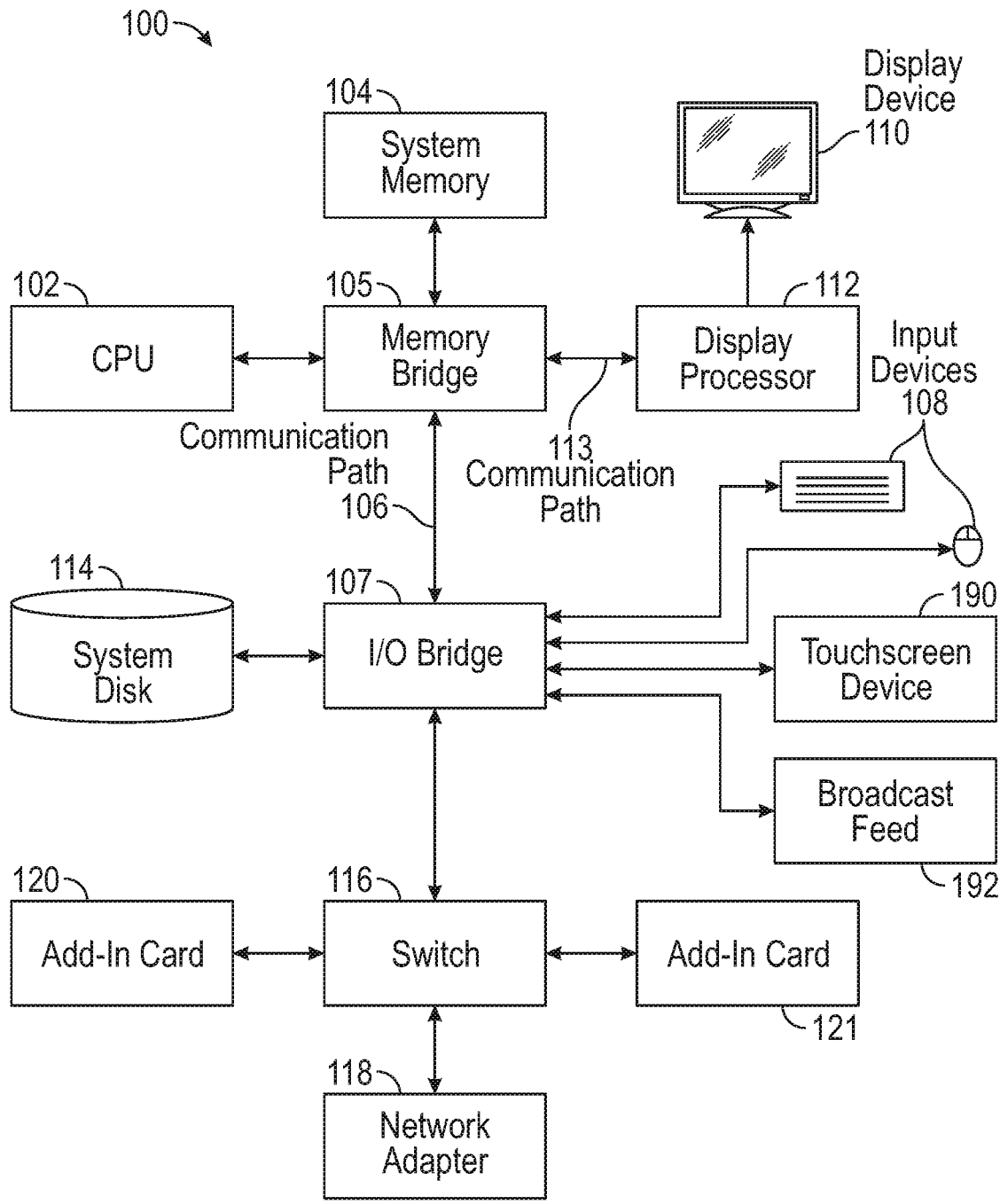
FIG. 1 is a system diagram illustrating a computing environment in which embodiments described herein can be implemented.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks. Such computer, other programmable apparatus or other device may include, without limitation, a personal computer, video game console, personal digital assistant, rendering engine, mobile device, or dedicated hardware platform, such as a very large scale integrated (VLSI) circuit, a field-programmable gate array (FPGA), or an application specific integrated circuit (ASIC).

I. Hardware Overview

FIG. 1 depicts one architecture of a system 100 within which embodiments of the present invention may be implemented. This figure in no way limits or is intended to limit the scope of the present disclosure. System 100 may be a personal computer, video game console, personal digital assistant, rendering engine, or any other device suitable for practicing one or more embodiments of the present disclosure.

As shown, system 100 includes a central processing unit (CPU) 102 and a system memory 104 communicating via a bus path that may include a memory bridge 105. CPU 102 includes one or more processing cores, and, in operation, CPU 102 is the master processor of system 100, controlling and coordinating operations of other system components. System memory 104 stores software applications and data for use by CPU 102. CPU 102 runs software applications and optionally an operating system. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices 108 (e.g., keyboard, mouse, joystick, digitizer tablets, touch pads, touch screens, still or video cameras, motion sensors, and/or microphones) and forwards the input to CPU 102 via memory bridge 105. In one embodiment, the computer system 100 is configured to implement an assignment analysis system that may receive player detection location data and assign player identities and roles to the player detection location data, as further described herein. In one embodiment, the input devices 108 may include a touchscreen device 190. In another embodiment, the input devices 108 may include a broadcast feed 192.

A display processor 112 is coupled to memory bridge 105 via a bus or other communication path (e.g., a PCI Express, Accelerated Graphics Port, or HyperTransport link); in one embodiment display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104.

Display processor 112 periodically delivers pixels to a display device 110 (e.g., a screen or conventional CRT, plasma, OLED, SED or LCD based monitor or television). Additionally, display processor 112 may output pixels to film recorders adapted to reproduce computer generated images on photographic film. Display processor 112 can provide display device 110 with an analog or digital signal.

A system disk 114 is also connected to I/O bridge 107 and may be configured to store content and applications and data for use by CPU 102 and display processor 112. System disk 114 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 116 provides connections between I/O bridge 107 and other components such as a network adapter 118 and various add-in cards 120 and 121. Network adapter 118 allows system 100 to communicate with other systems via an electronic communications network, and may include wired or wireless communication over local area networks and wide area networks such as the Internet.

Other components (not shown), including USB or other port connections, film recording devices, and the like, may also be connected to I/O bridge 107. For example, an audio processor may be used to generate analog or digital audio output from instructions and/or data provided by CPU 102, system memory 104, or system disk 114. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, CPU 102, and I/O bridge 107 to form a system on chip (SoC). In still further embodiments, display processor 112 is omitted and software executed by CPU 102 performs the functions of display processor 112.

Pixel data can be provided to display processor 112 directly from CPU 102. In some embodiments of the present invention, instructions and/or data representing a scene are provided to a render farm or a set of server computers, each similar to system 100, via network adapter 118 or system disk 114. The render farm generates one or more rendered images of the scene using the provided instructions and/or data. These rendered images may be stored on computer-readable media in a digital format and optionally returned to system 100 for display. Similarly, stereo image pairs or multiview autostereoscopic images processed by display processor 112 may be output to other systems for display, stored in system disk 114, or stored on computer-readable media in a digital format.

Alternatively, CPU 102 provides display processor 112 with data and/or instructions defining the desired output images, from which display processor 112 generates the pixel data of one or more output images, including characterizing and/or adjusting the offset between stereo image pairs, in the case of stereoscopic images, or generating and interleaving multiple views, in the case of multiview autostereoscopic images. The data and/or instructions defining the desired output images can be stored in system memory 104 or graphics memory within display processor 112. For example, CPU 102 could execute a client media player application (not shown) that receives a media stream from a content provider, and transmits the media stream to the display processor 112 for viewing on the display device 110. In an embodiment, display processor 112 includes 3D rendering capabilities for generating pixel data for output images from instructions and data defining the geometry, lighting shading, texturing, motion, and/or camera parameters for a scene. Display processor 112 can further include one or more programmable execution units capable of executing shader programs, tone mapping programs, and the like.

CPU 102, render farm, and/or display processor 112 can employ any surface or volume rendering technique known in the art to create one or more rendered images from the provided data and instructions, including rasterization, scanline rendering REYES or micropolygon rendering, ray casting, ray tracing, image-based rendering techniques, and/or combinations of these and any other rendering or image processing techniques known in the art.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies display processor 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

II. Joint Heterogeneous Language-Vision Embeddings for Video Tagging and Search

Learning a joint language-visual embedding has a number of very appealing properties and can result in variety of practical applications, including natural language image/video annotation and search. Embodiments presented herein provide a variety of different joint language-visual neural network models for video annotation and retrieval tasks. In doing so, embodiments can take into account the importance of attention, joint temporal modeling and the use of heterogeneous linguistic descriptions for testing and training. Generally, attention, which allows the network to attend to frames of the video that align well with corresponding linguistic phrase or sentence descriptions, leads to more accurate retrieval results. Further, the described techniques show significant improvement over conventional techniques, by providing joint temporal modeling of videos and sentences (as opposed to simple average or attended frame representations). Moreover, embodiments provide a loss function that enables the effective training of proposed model from heterogeneous linguistic descriptions, including full sentences, and noun/verb phrases.

Recently, there has been an increased interest in jointly modeling images/videos and natural language sentences. Such models that jointly learn from videos/images and natural language sentences have broad applicability to visual search, retrieval, captioning, or visual question answering tasks. Additionally, jointly learning from language and visual modalities can be mutually beneficial.

However, the progress on video-language models has been limited. Such difficulty stems from additional challenges that come from the need to encode the temporal aspects of the video and the sheer volume of the video data required to be processed (e.g., Large Scale Movie Description Challenge (LSMDC) dataset contains nearly 60-times the number of frames as images). For example, in the video-language domain, models may focus predominantly on video description generation, using Long Short-Term Memory (LSTM) models to generate sentences given an encoding of the video. In principal, such models could also be run in the opposite direction to generate an encoding of the video and therefore match to a given natural language query, however, this presents further challenges. Foremost, the full-sentence descriptions present in LSMDC differ significantly from the phrase-based queries that are more typical in search. Further, associated audio description (AD) captions are typically relatively verbose and very precise. This can result in models that tend to overfit and therefore cannot generalize well.

Embodiments address these challenges by providing a class of multi-modal neural networks models equipped with attention, specifically designed for the video retrieval task. Embodiments describe herein provide joint visual-language neural network models and provide various approaches for integrating soft attention. Moreover, embodiments provide a ranking loss function that incorporates visual information and heterogeneous linguistic information, including complete AD sentences, noun phrases (NPs) and verb phrases (VPs) effectively, resulting in significant retrieval performance improvement.

One embodiment includes training a joint language-visual embedding space, where images/videos and their corresponding linguistic descriptions project to the same or nearby points in the hypothetical semantic space. In such an embodiment, a language query can be projected into this semantic space in order to retrieve a ranked list of the images/videos ranked by the distance to the query in the embedding space. Additionally, a similar process can be performed for image/video query in the opposite direction.

One embodiment uses an attention model to encode the representation of the video. In such an embodiment, a representation of the linguistic description can be used to predict relevance of each frame of the video and this relevance can, in turn, be used as a soft weighting for averaging feature information of each frame. In a particular embodiment, a dynamic attention model coupled with a recurrent neural network is used to produce a representation of digital video data. In such an embodiment, the weighting can be computed dynamically as words of the description are processed by the model and this weighting can be incorporated through a neural network recurrent model.

One embodiment provides a training objective function that takes description length into account, such that if a given video has multiple descriptions of varying length, the most specific (longest) description is associated with the video most closely and the less specific (shorter) descriptions are less closely. For example, consider a video having the set of natural language description tags: "Bear climbing up the ladder to get honey which he intends to eat", "bear climbing", "intending to eat honey", and "bear on ladder". In this case, the data model could ensure that the video depicting this scene would appear closest to the tag "Bear climbing up the ladder to get honey which he intends to eat" in the semantic embedding space, followed by the tags "intending to eat honey", "bear on ladder", and "bear climbing." As such, when the video is used as part of a query, the phrase "bear climbing" could be returned as the 4th in the ranked list of annotations within the query results. Doing so provides a significant improvement in performance on both video annotation and retrieval tasks.

Figure 2:
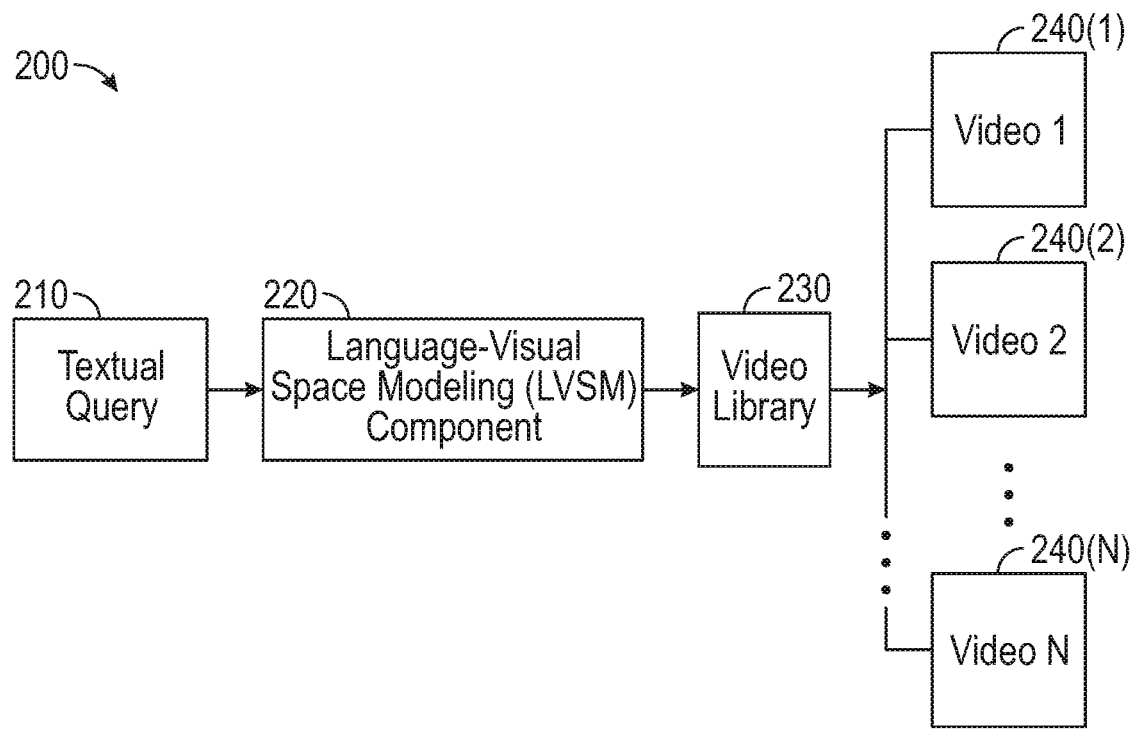
FIG. 2 is a block diagram illustrating a workflow for identifying instances of video content relating to a textual query, according to one embodiment described herein.

FIG. 2 is a block diagram illustrating a workflow for identifying instances of video content relating to a textual query, according to one embodiment described herein. As shown, the workflow 200 depicts a textual query 210 that is transmitted to a language-visual space modeling (LVSM) component 220. The LVSM component 220 is generally configured to access a data model using the received textual query 210 and to determine that the instance of video content 240(1)-(N), from the video library 230, are related to the textual query 210.

Figure 3:
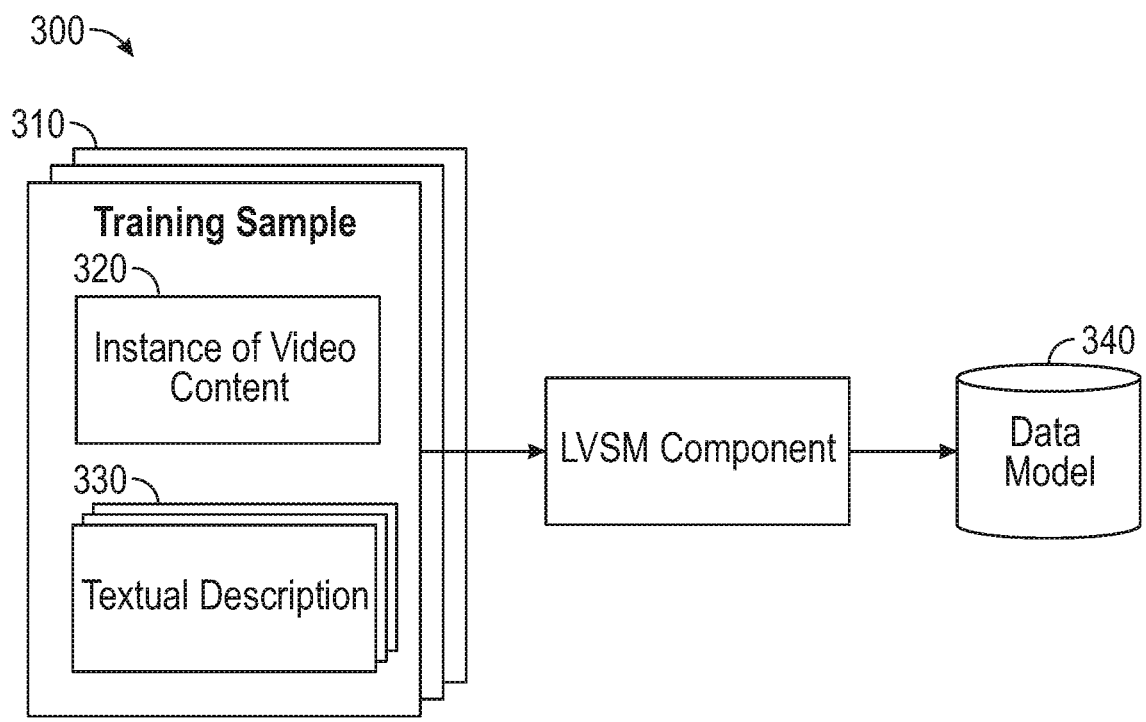
FIG. 3 is a block diagram illustrating a workflow for training a data model to identify instances of video content relating to a textual query, according to one embodiment described herein.

Generally, the LVSM component 220 can train the data model using a plurality of training samples. FIG. 3 is a block diagram illustrating a workflow for training a data model to identify instances of video content relating to a textual query, according to one embodiment described herein. As shown, the workflow 300 depicts a plurality of training samples 310 being processed by the LVSM component 220 to train the data model 340. Generally, each of the training samples 310 includes an instance of video content 320 and a plurality of textual descriptions that comprise natural language words describing the instance of video content 320. For instance, in the aforementioned example, the textual descriptions 330 could comprise the natural language description tags: "Bear climbing up the ladder to get honey which he intends to eat", "bear climbing", "intending to eat honey", and "bear on ladder". The LVSM component 220 could train the data model 340, such that a textual query 210 can be input into the data model 340, in order to determine which instances of video content from the video library 230 are most related to the textual query 210.

In one embodiment, the data model comprises a multi-modal neural network model equipped with an attention mechanism. In a particular embodiment, the data model 340 comprises a joint video-language model by computing a simple average of video frames FC-7 representation as the video representation. In another embodiment, the data model 340 integrates an attention mechanism by aligning a last state of a language LSTM with video frames and computing the weighted average of video frames FC-7 representation as the video representation. In a specific embodiment, the data model 340 comprises a joint language-video attention-based model, where at each time-step, a soft attention mechanism aligns the language LSTM hidden state and video frames by computing attention weights, and then a weighted average of frames FC-7 representation is fed to a second LSTM (e.g., a video LSTM). In such an embodiment, the semantic language and video can be the output of the last hidden state of the language and video LSTMs, respectively. By jointly using two distinct LSTMs and integrating an attention model, embodiments described herein can accurately identify the instances of video content 240(1)-(N) corresponding to the textual query 210.

Of note, while examples are provided herein with respect to LSTM recurrent neural networks, more generally any sort of suitable recurrent network could be used, consistent with the functionality described herein. For example, in one embodiment, the system includes a Gated Recurrent Units (GRU) neural network module that is configured to learn at least one of a language space (e.g., based on textual descriptions relating to images and video content) and a visual space (e.g., based on the images and video content).

As discussed above, the textual descriptions 330 each include one or more natural language words. Generally, the length of the textual descriptions 330 can be variable in length. In a particular embodiment, the length of a textual description 330 is measured by the number of words within the textual description 330. In one embodiment, the LVSM component 220 is configured to encode each word within the textual descriptions 330 using a Global Vectors for Word Representation (GloVe) model. For instance, such a GloVe model could be trained using a substantial number of different word tokens on various data sets. For example, such datasets could include popular wiki sites, text data archives, and other natural language sources. The LVSM component 220 could encode each textual description 330 as a matrix, as defined by Equation 1 below, where N represents the number of word feature vectors, and each vector has $d_w$ dimensions.

$$S=\{w_1,\ldots,w_N\} \in R^{N \times d_w}$$ Equation 1—Textual Description Matrix Representation In one embodiment, the data model 340 represents each instance of video content 320 as a sequence of frames. For example, the LVSM component 220 could sample each instance of video content 320 at a predefined interval (e.g., every 10 frames) to generate the sequence of frames describing the instance of video content 320. In a particular embodiment, the LVSM component 220 trains the data model 340 using single images, and in such an embodiment, the LVSM component 220 can be configured to treat the images as a single frame instance of video content.

The LVSM component 220 could extract frame features from the sequence of frames. In one embodiment, the LVSM component 220 extracts the frame features using a pre-trained spatial convolutional neural network. Generally, the video sequence length can vary across the instances of video content 320 in the training samples 310. As such, the LVSM component 220 can be configured to a convolutional neural network (e.g., a VGG-19 model network) trained for object classification for a predefined number of different object classes. Generally, each instance of video content 320 can be represented as a matrix as shown in Equation 2 below, where M represents a number of feature vectors, and each vector has $d_v$ dimensions.

$$V=\{v_1,\ldots,v_M\} \in R^{M \times d_v}$$ Equation 2—Video Content Matrix Representation In a particular embodiment, the convolutional neural network model that is used for object classification has 16 convolutional layers and 3 Fully Connected (FC) layers, followed by a softmax output layer. Additionally, a second Fully Connected layer (e.g., FC7) is extracted, and each vector has 4096 dimensions.

As discussed above, in some embodiments, the LVSM component 220 generates the data model 340 to include a soft-attention model. In one embodiment, the soft-attention model is parameterized as a feed-forward neural network that is jointly trained with other modules in the model including sentence and video LSTMs. In other words, the gradients of the LSTMs ranking objective can be backpropagated not only through the LSTMs network but also through the attention network that allows joint training of LSTMs and soft-attention networks. In one embodiment, the LVSM component 220 generates the data model 340 to include a model for aligning statistically encoded part(s) of the textual query 210 using LSTM and the frames of the video. Such an alignment model can generate a score for each video frame $v_i$ at each time step t of the language LSTM within the data model 340. Such a score represents how well a sequentially modeled sentence up to time t−1 and video frame $v_i$ are semantically matched. In other words, the matching score $m_{t,i}$ can reveal the relevance of the video frame $v_i$ and the language LSTM hidden state at the time t−1, wherein the matching score $m_{t,i}$ is defined as shown in Equation 3 below.

$$m_{t,i} = \Phi(h_{t-1}, v_i) \quad \text{Equation 3—Match Score}$$

In the depicted Equation 3, $h_{t-1}$ represents the language LSTM hidden state at the time t−1 that contains information related to a sequentially modeled sentence up to the time t−1. For an attention model $\Phi$, every state $h_{t-1}$ is summed with every video-data $v_i$ to obtain matching-vectors. The matching-vectors can then be transformed into a single number which represents the matching score $m_{t,i}$. In one embodiment, the soft-attention model matching-vector dimension is one of the network parameters. Additionally, the LVSM component 220 can compute attention weights by normalizing matching-scores in a softmax (or softmax-like) function. In a particular embodiment, the attention weight $w_{t,i}$ for a video frame i of an instance of video content at a time t is calculated using the Equation 4 depicted below.

Attention Weight $$w_{t,i} = \frac{\exp(m_{t,i})}{\sum_{j=1}^{T} \exp(m_{t,j})} \quad \text{Equation 4}$$

In one embodiment, the attention weight $w_{t,i}$ defines a soft-alignment between encoded sentences and video frames, such that a higher attention weight $w_{t,i}$ reflects more saliency attributes to a specific video frame i with respect to words in the sentence.

Additionally, the LVSM component 220 can compute the weighted average of the video frames using the attention weights. In other words, the LVSM component 220 can generate an attention-based representation $k_t(A)$ of the instance of video content by calculating a weighted average $k_t(A)$ of the video frames using the computed attention weights $w_{t,i}$, using the Equation 5 shown below.

Attention-based Representation $$k_t(A) = \sum_{i=1}^{T} w_{t,i} v_i \quad \text{Equation 5}$$

Generally, the LVSM component 220 can be configured to generate and use a variety of different types of data models 340. In some embodiments, the data model 340 is equipped with an attention network. In generating the data model 340, the LVSM component 220 can learn a word embedding with 300 units using a fully connected layer and tan h non-linearity.

Figure 4A:
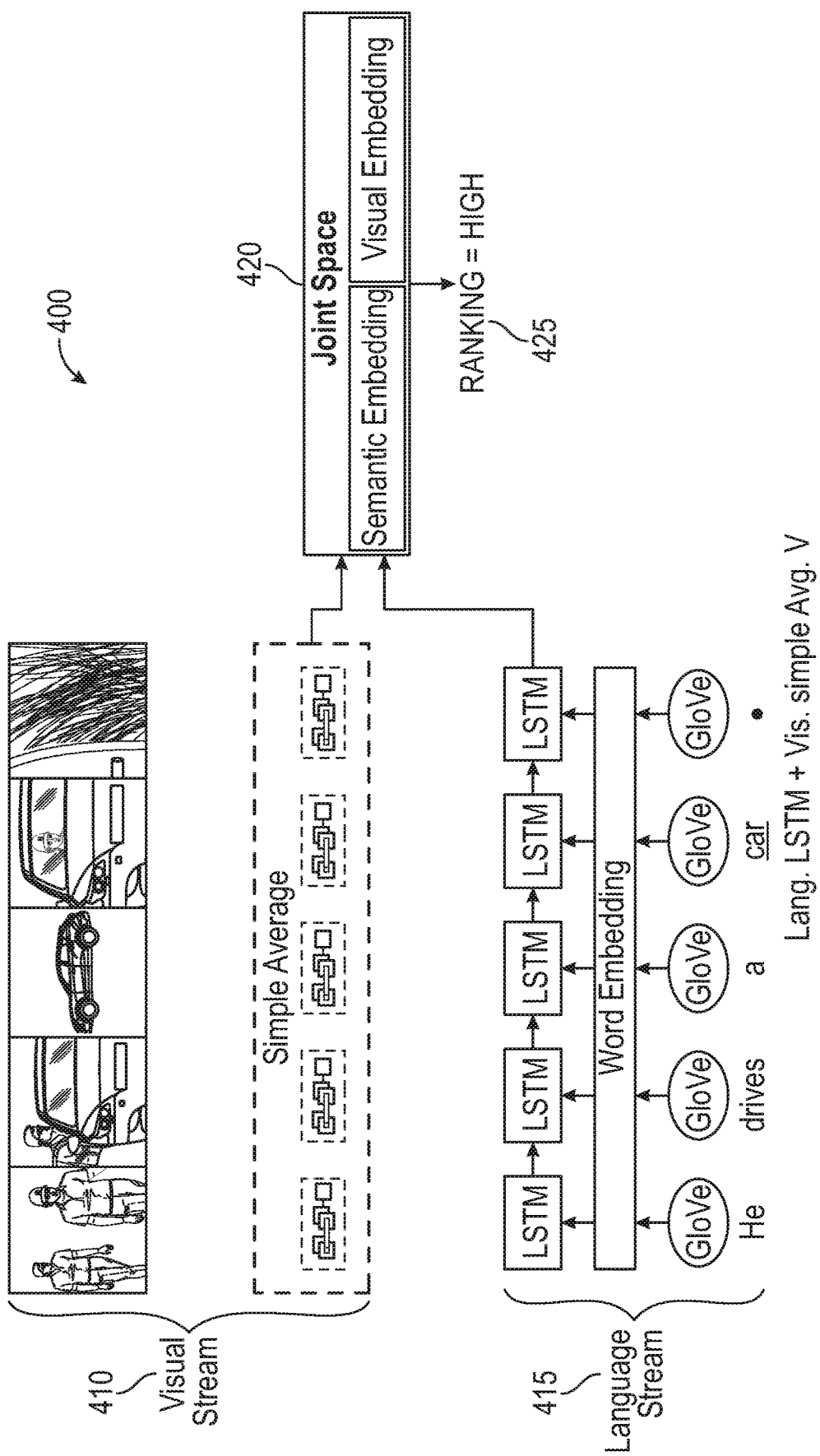
FIGS. 4A-C illustrate neural network data models configured to identify instances of video content relating to a textual query, according to embodiments described herein.
Figure 4B:
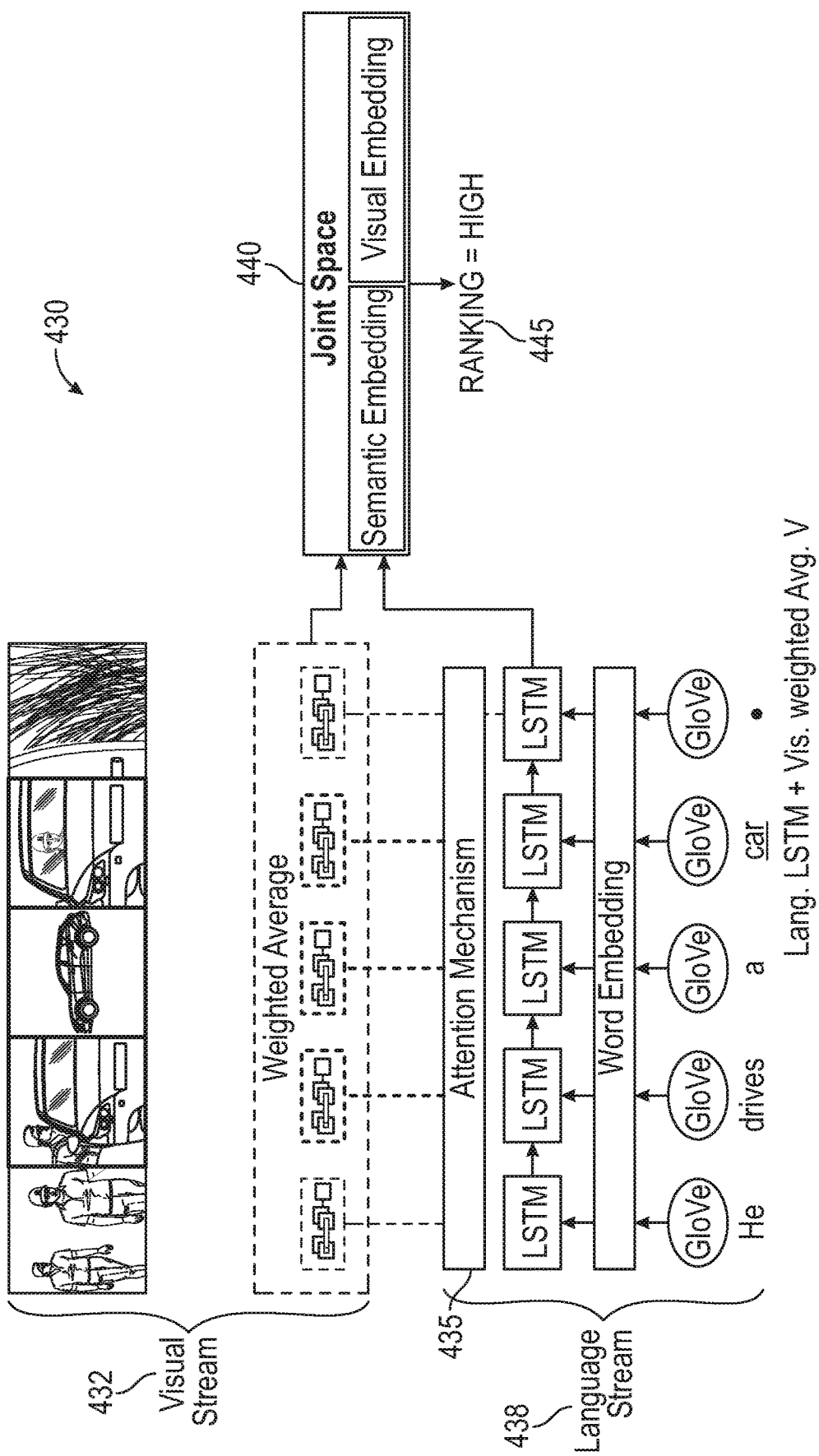
Figure 4C:
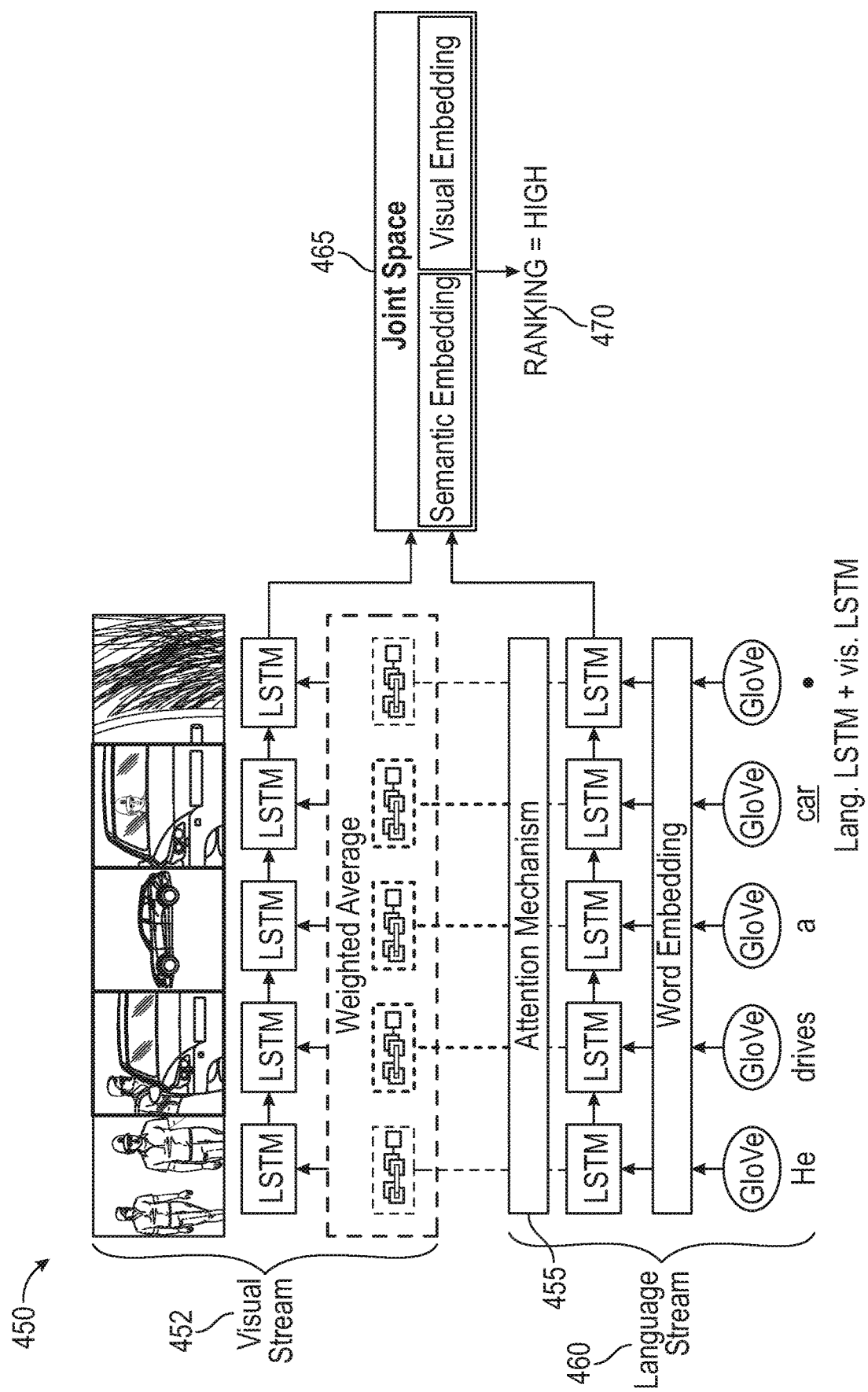

One example of FIGS. 4A-C illustrate neural network data models configured to identify instances of video content relating to a textual query, according to embodiments described herein. In the embodiment shown in FIG. 4A, the LVSM component 220 generates the data model 340 to include a language LSTM and a visual simple average V, where sentences are encoded using a LSTM module and videos are encoded using a simple average of video feature vectors V. In such an embodiment, the averaged video frames representation can be linearly transformed into the joint language-visual space. As shown, the model 400 includes both an input visual stream 410 and an input language stream 415. The words of the textual query ("He drives a car." in the depicted example) are processed using language LSTMs, while the visual stream is encoded using a simple average of video feature vectors. The result is a joint modelling space 420, which can be used to determine a ranking 425 for the textual query. In one embodiment, the model 400 is trained using order-embedding pair-wise ranking objectives, and video and sentence embedding vectors are constrained to only positive values by computing their absolute values.

In another embodiment, the LVSM component 220 can generate the data model 340 where sentences are encoded using LSTM modules, while soft-attention techniques are used to align the output of the last state of the language LSTM $h_M$ with all feature vectors in V. For example, the video content could be encoded using the attention-based representation described above. An example of such a data model is shown in FIG. 4B, where the data model 430 processes the visual stream 432 to the calculate the visual simple average V and processes the language stream 438 using LSTMs. The attention mechanism 435 is configured to align the output of the last state of the language LSTM $h_M$ with all feature vectors in V. The resulting joint modelling space 440, which can be used to determine a ranking 445 for the textual query. Generally, in such an embodiment, video can be encoded using the weighted average of frame feature vectors and the video representation can be linearly transformed into the joint embedding space 440 obtained by minimizing an order-embedding pair-wise ranking loss function.

FIG. 3C represents a third embodiment, where the LVSM component 220 generates the data model 340 in which sentences are still encoded using LSTM modules, but a soft-attention module is provided to align each output of the state of the language LSTM $h_{t-1}$ and video frames V, and at each step the attention-based representation is fed to a second LSTM (e.g., a video LSTM) that learns the video embedding. In such an embodiment, the sentence LSTM and the video LSTM have the same number of parameters. The resulting joint modelling space 465, which can be used to determine a ranking 470 for the textual query.

In one embodiment, the language LSTM is configured such that state $h_{t-1}$ of the language LSTM neural network module is updated according to the following intermediate functions:

$$i_t = \sigma(W_i v_t + U_i h_{t-1} + b_i),$$

$$f_t = \sigma(W_f v_t + U_f h_{t-1} + b_f),$$

$$o_t = \sigma(W_o v_t + U_o h_{t-1} + b_o),$$

$$g_t = \tan h(W_c v_t + U_c h_{t-1} + b_c),$$

$$c_t = f_t c_{t-1} + i_t g_t,$$

$$h_t = o_t \tan h(c_t),$$

In such an embodiment, $i_t$ represents an input gate, $f_t$ represents an forget gate, $o_t$ represents an output gate, and $c_t$ represents a cell gate of the language LSTM neural network module at a time t. In such an embodiment, $i_t$, $f_t$ and $o_t$ can be used to control the influence of the current input $g_t$ and the previous memory state $c_{t-1}$ on generating a new hidden state $h_t$. The terms $W_i$, $W_f$, $W_o$, $W_c$, $U_i$, $U_f$, $U_o$, and $U_c$ encode the various matrices $b_i$, $b_f$, $b_o$, and $b_c$ corresponding biases.

In certain embodiments, a pairwise ranking loss function is used for image retrieval. For example, embodiments could be configured to use the function shown in Equation 6.

Pairwise Ranking Loss Function $$\sum_{(c,v)} \left( \sum_{c'} \max\{0, \alpha - S(c, v) + S(c', v)\} + \sum_{v'} \max\{0, \alpha - S(c, v) + S(c, v')\} \right) \quad \text{Equation 6}$$

Here, (c, v) represents the ground-truth pair of video and textual description, c' (contrastive captions) are captions not belonging to v, and v' (contrastive videos) are images that are not captioned by c, α is a margin hyperparameter, and S is a similarity function. In one embodiment, a negative order-violation penalty is used, as shown in Equation 7.

$$S(c,v) = -E(v,c) \quad \text{Equation 7—Negative Order-Violation Penalty}$$

As shown, E represents an order-violation function, and in one embodiment, E is defined as shown in Equation 8.

$$E(x,y) = \|\max(0, y-x)\|^2 \quad \text{Equation 8—Order-violation Function}$$

Such a function can be advantageous, as the function is asymmetric compared to cosine similarity (which is symmetric), so the function can capture the relatedness of captions with very different lengths that describe the same visual content but in different levels of detail.

In one embodiment, the LSVM component 220 is configured to use a weighted pair-wise ranking function. Such a function can enable the LSVM component 220 to effectively augment the caption data with Noun Phrases (NPs) and Verb Phrases (VPs). That is, for video retrieval, the original captioned sentence could be ranked higher compared to phrases (including NPs and VPs) which are part of the complete caption. As such, the LSVM component 220 could use a weighted pair-wise ranking function as shown in Equation 9.

$$\gamma(c_p, v) = \text{len}(c_p)/\text{len}(c_o) \quad \text{Equation 9—Ranking Weight}$$

In such an embodiment, $c_p$ represents the caption phrase, $c_o$ is the original caption and v represents the paired video. Additionally, len represents the number of words either in the sentence or the phrase. By doing so, multiple textual descriptions can be provided for a single instance of video content (including the original captions). In one embodiment, the weighted pairwise ranking function shown in Equation 10 is used to rank the relevancy of the various phrases (including original phrases, NPs, VPs, and so on).

Weighted Pairwise Ranking $$\sum_{(c,v)} \gamma(c,v) \left( \sum_{c'} \max\{0, \alpha - S(c, v) + S(c', v)\} + \sum_{v'} \max\{0, \alpha - S(c, v) + S(c, v')\} \right) \quad \text{Equation 10}$$

Figure 5:
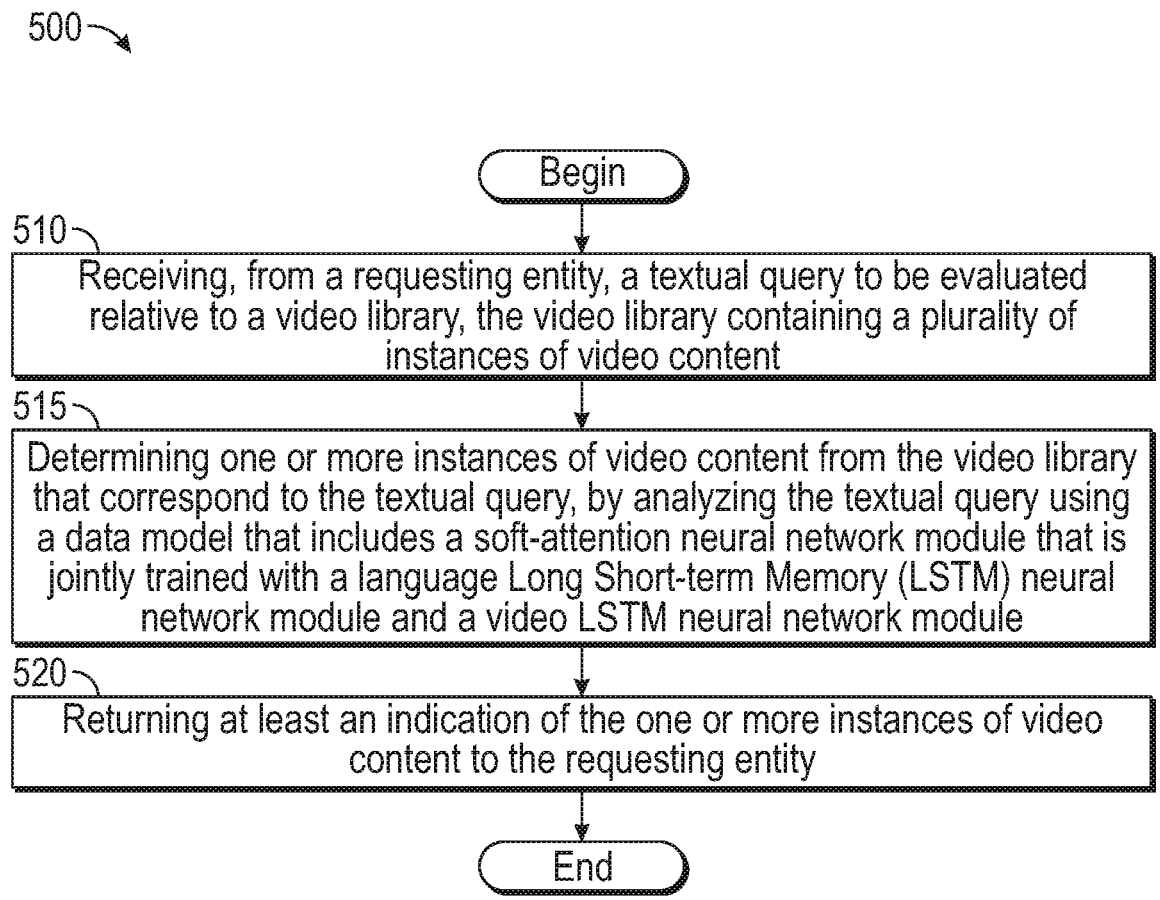
FIG. 5 is a flow diagram illustrating a method for determining instances of video content relating to a textual query, according to one embodiment described herein.

FIG. 5 is a flow diagram illustrating a method for determining instances of video content relating to a textual query, according to one embodiment described herein. As shown, the method begins at block 500, where a LVSM component 220 receives, from a requesting entity (e.g., a client computing device), a textual query to be evaluated relative to a video library. In the present example, the video library contains a plurality of instances of video content. The LVSM component 220 determines one or more instances of video content from the video library that correspond to the textual query, by analyzing the textual query using a data model (block 515). In the present example, the data model includes a soft-attention neural network module that is jointly trained with a LSTM neural network module and a video LSTM neural network module. The LVSM component 220 returns at least an indication of the one or more instances of video content to the requesting entity (block 520), and the method 500 ends.

Figure 6:
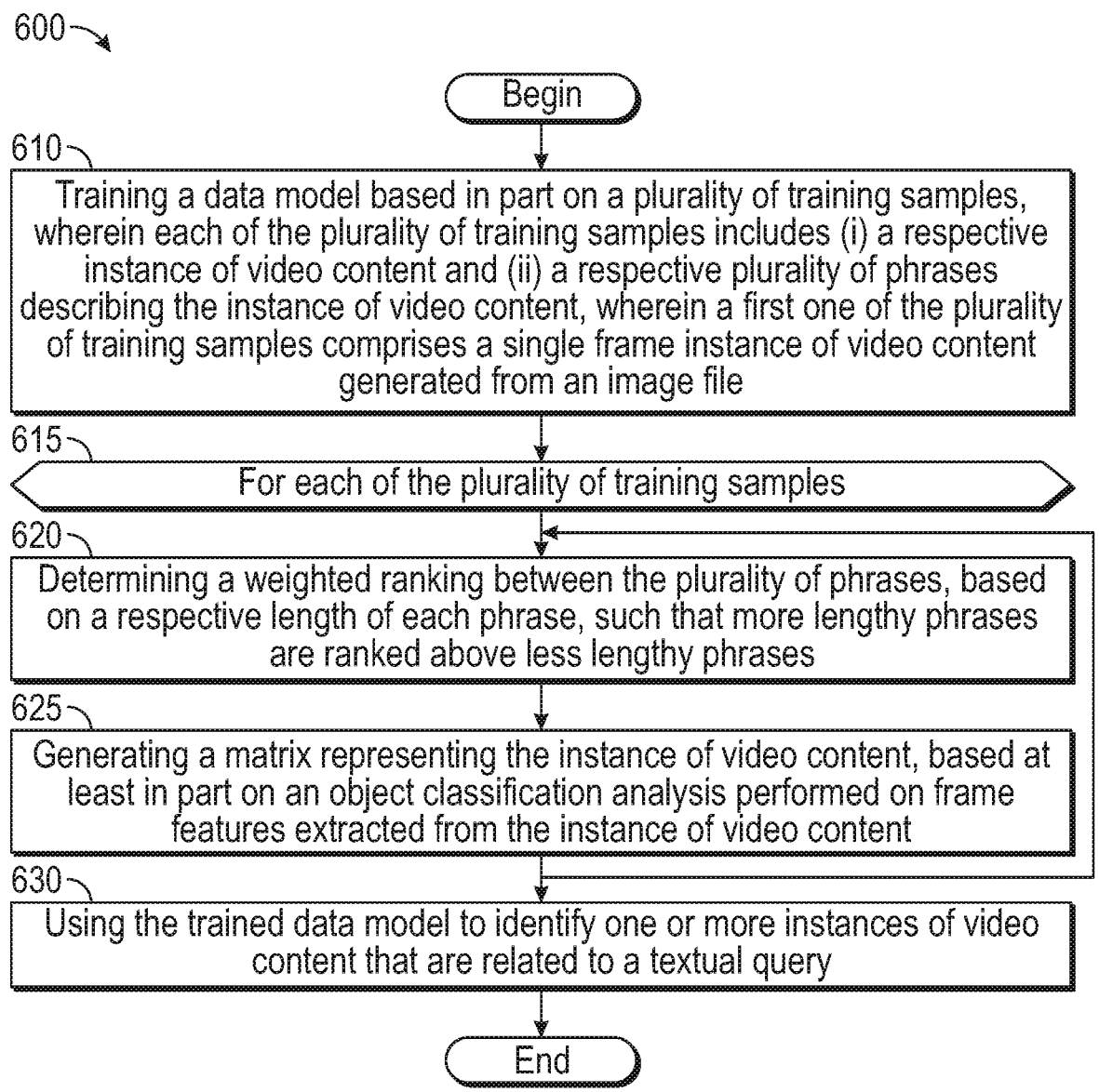
FIG. 6 is a flow diagram illustrating a method for training and using a data model for identifying instances of video content relating to a textual query, according to one embodiment described herein.

FIG. 6 is a flow diagram illustrating a method for training and using a data model for identifying instances of video content relating to a textual query, according to one embodiment described herein. As shown, the method 600 begins at block 610, where the LVSM component 220 trains a data model based in part on a plurality of training samples. In the depicted embodiment, the plurality of training samples each include (i) a respective instance of video content and (ii) a respective plurality of phrases describing the instance of video content. Additionally, a first one of the plurality of training samples comprises a single frame video file that is generated based on an image. In other words, the data model can be trained using both image and video content, where the image content is treated as a video having only a single frame.

The method 600 then enters a loop at block 615, where for each of the plurality of training samples, the LVSM component 220 determines a weighted ranking between the plurality of phrases describing the training sample (block 620). In the present example, the LVSM component 220 assigns a higher ranking to lengthier phrases and a lower ranking to shorter phrases. For example, where a given video has multiple textual descriptions of varying length, the lengthiest description can be associated with the video more closely and the shorter descriptions are less closely. In one embodiment, the length of a phrase is determined based on the number of words within the phrase. For example, consider a video having the set of natural language description tags: "Bear climbing up the ladder to get honey which he intends to eat", "bear climbing", "intending to eat honey", and "bear on ladder". In such an example, the LVSM component 220 could train the data model such that a video depicting this scene would appear closest to the phrase "Bear climbing up the ladder to get honey which he intends to eat" in the semantic embedding space, followed by the tags "intending to eat honey", "bear on ladder", and "bear climbing." In a particular embodiment, the LVSM component 220 is configured to remove any stop words from the phrases, before evaluating the length of the phrases.

The LVSM component 220 then generates a matrix representing the instance of video content for the training sample, based at least in part on an object classification analysis performed on frame features extracted from the instance of video content (block 625). The limitations of determining the weighted ranking (block 620) and generating the matrix (block 625) can be performed for each training sample in the plurality of training samples. The LVSM component 220 uses the trained data model to identify one or more instances of video content that are related to a textual query (block 630), and the method 600 ends.

Figure 7:
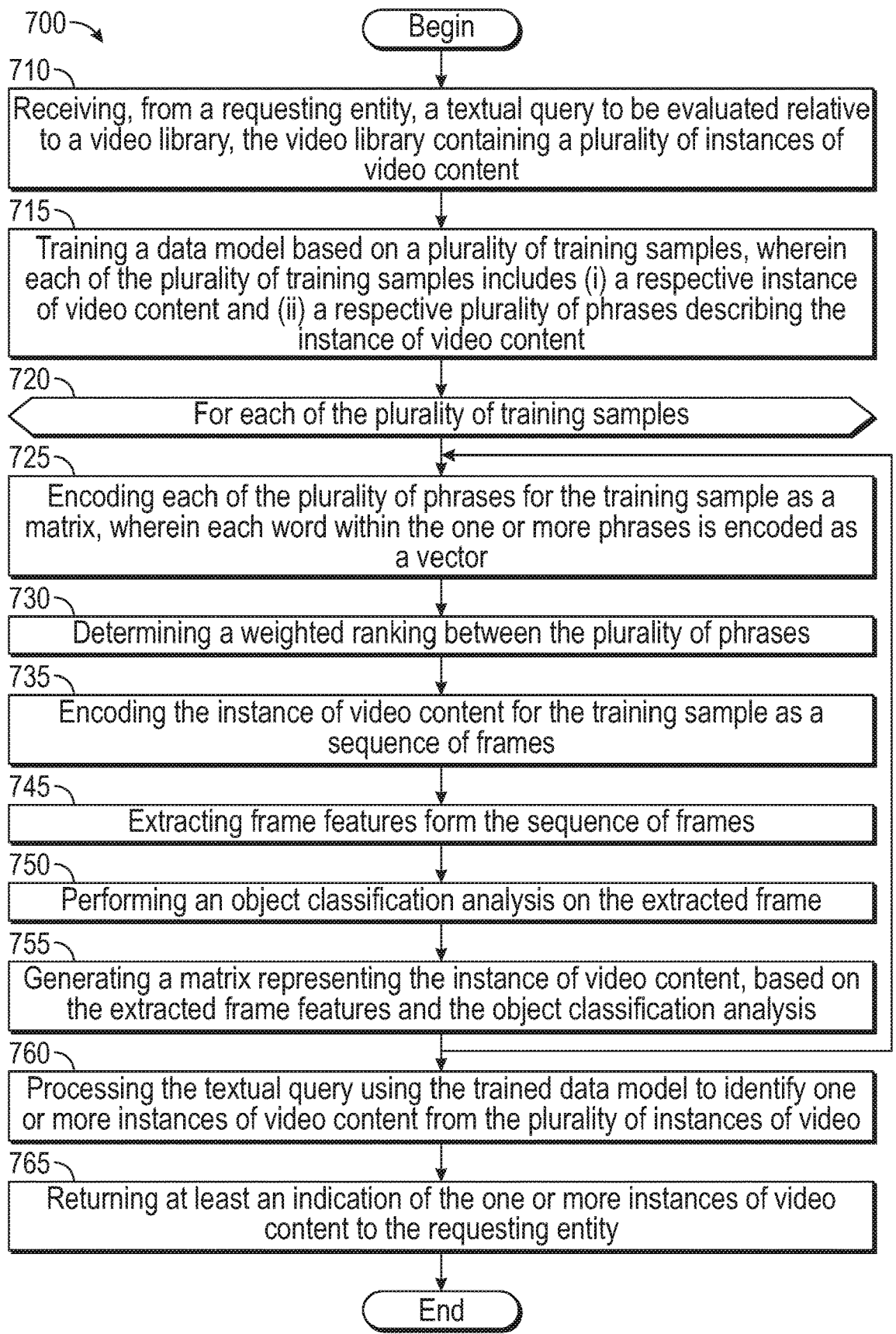
FIG. 7 is a flow diagram illustrating a method for training a data model based on a weighted ranking between textual phrases in a training data set and identifying instances of video content relating to a textual query, according to one embodiment described herein.

FIG. 7 is a flow diagram illustrating a method for training a data model based on a weighted ranking between textual phrases in a training data set and identifying instances of video content relating to a textual query, according to one embodiment described herein. As shown, the method 700 begins at block 710, where the LVSM component 220 receives, from a requesting entity, a textual query to be evaluated relative to a video library that contains a plurality of instance of video content. The LVSM component 220 trains a data model based on a plurality of training samples, that each contain (i) a respective instance of video content and (ii) a respective plurality of phrases describing the instance of video content (block 715). In training the data model, the method 700 enters a loop at block 720, where for each of the plurality of training samples, the LVSM component 220 encodes each of the plurality of phrases for the training sample as a matrix, where each word in the one or more phrases is encoded as a respective vector (block 725).

The LVSM component 220 determines a weighted ranking between the plurality of phrases describing the training sample (block 730). For instance, the LVSM component 220 could rank the phrases by how many words each phrase contains, where lengthier phrases are assigned a higher ranking (indicating a stronger correlation with the instance of video content) than less lengthy phrases. The LVSM component 220 encodes the instance of video content as a sequence of frames (block 735). As an example, the LVSM component 220 could sample the instance of video content every n frames (e.g., every 10 frames) to generate the sequence of frames. More generally, any sampling interval can be used, consistent with the functionality described herein. In one embodiment, the sequence of frames contains all of the frames within the instance of video content.

The LVSM component 220 next extracts frame features from the frames in the sequence of frames (block 745). The LVSM component 220 performs an object classification analysis on the extracted frame features (block 750). The LVSM component 220 generates a matrix representing the instance of video content, based on the extracted frame features and the object classification analysis (block 755). The limitations at block 725, 730, 735, 745, 750 and 755 can then be repeated for each of the plurality of training samples.

Once the data model is trained, the LVSM component 220 processes the textual query using the trained data model to identify one or more instances of video content from the plurality of instances of video content (block 760). The LVSM component 220 returns at least an indication of the one or more instances of video content to the requesting entity (block 765), and the method 700 ends.

While the foregoing is directed to embodiments of the present invention, other and further embodiments of the invention may be devised without departing from the basic scope thereof, and the scope thereof is determined by the claims that follow. Additionally, additional embodiments and details of the aforementioned embodiments can be found in the included Appendices, which are hereby incorporated by reference in their entirety.

What is claimed is:

1. A computer-implemented method of querying video content, the computer-implemented method comprising:
    receiving, from a requesting entity, a textual query to be evaluated relative to a video library, the video library containing a plurality of instances of video content;
    training a data model based on a plurality of training samples, wherein the data model comprises a soft-attention neural network module, a language Long Short-term Memory (LSTM) neural network module, and a video LSTM neural network module, which are jointly trained, wherein each of the plurality of training samples includes (i) a respective instance of video content and (ii) a respective plurality of phrases describing the respective instance of video content, wherein training the data model comprises, for each of the plurality of training samples:
        encoding each of the plurality of phrases for the training sample as a matrix, wherein each word within the plurality of phrases is encoded as a vector using a trained model for word representation, wherein the trained model is separate from the data model;
        determining a weighted ranking between the plurality of phrases, based on a respective length of each phrase, such that lengthier phrases are ranked above less lengthy phrases;
        encoding the respective instance of video content for the training sample as a sequence of frames;
        extracting frame features from the sequence of frames;
        performing an object classification analysis on the extracted frame features; and
        generating a matrix representing the respective instance of video content, based on the extracted frame features and the object classification analysis, the matrix including feature vectors;
    processing the textual query using the trained data model to identify a ranking of the plurality of instances of video content responsive to the textual query, wherein the soft-attention neural network module aligns an output of a last state of the language LSTM neural network module with feature vectors of an instance of the plurality of instances of video content, wherein the ranking is identified by generating an attention-based representation that is fed to the video LSTM neural network module, wherein the attention-based representation is generated by calculating an attention-weighted average of frames of the instance of video content based on the aligned output and minimizing a ranking loss function having a penalty function that is asymmetric; and
    returning at least an indication of the ranking of the plurality of instances of video content to the requesting entity.

2. The computer-implemented method of claim 1, wherein extracting the frame features from the sequence of frames is performed using a pretrained spatial convolutional neural network.

3. The computer-implemented method of claim 1, wherein the generated matrix representing the video is formed as $V=\{v_1, \ldots, v_M\} \in R^{M \times d_v}$ of M video feature vectors, wherein each video feature vector has $d_v$ dimensions.

4. The computer-implemented method of claim 3, wherein the object classification analysis is performed on the extracted frame features using a deep convolutional neural network trained for object classification, wherein the deep convolutional neural network comprises a defined number of convolutional layers and a defined number of fully connected layers, followed by a softmax output layer.

5. The computer-implemented method of claim 1, wherein determining the weighted ranking between the plurality of phrases comprises:
  determining, for each of the plurality of phrases, the respective length of the phrase.

6. A computer-implemented method of querying video content, the computer-implemented method comprising:
  receiving, from a requesting entity, a textual query to be evaluated relative to a video library, the video library containing a plurality of instances of video content;
  training a data model based in part on a plurality of training samples, wherein the data model comprises a soft-attention neural network module that is jointly trained with a language Long Short-term Memory (LSTM) neural network module and a video LSTM neural network module, wherein each of the plurality of training samples includes (i) a respective instance of video content and (ii) a respective plurality of phrases describing the respective instance of video content, wherein a first one of the plurality of training samples comprises a single-frame instance of video content generated from an image file, and wherein training the data model comprises, for each of the plurality of training samples:
    encoding each of the plurality of phrases for the training sample as a matrix, wherein each word within the plurality of phrases is encoded as a vector using a trained model for word representation, wherein the trained model is separate from the data model;
    determining a weighted ranking between the plurality of phrases, based on a respective length of each phrase, such that lengthier phrases are ranked above less lengthy phrases; and
    generating a matrix representing the respective instance of video content, based at least in part on an object classification analysis performed on frame features extracted from the respective instance of video content, the matrix including feature vectors; and
  processing the textual query using the trained data model to identify a ranking of the plurality of instances of video content responsive to the textual query, wherein the soft-attention neural network module is aligns an output of a last state of the language LSTM neural network module with feature vectors of an instance of the plurality of instances of video content, wherein the ranking is identified by generating an attention-based representation that is fed to the video LSTM neural network module, wherein the attention-based representation is generated by calculating an attention-weighted average of video frames of the instance of video content based on the aligned output and minimizing a ranking loss function having a penalty function that is asymmetric; and
  returning at least an indication of the ranking of the plurality of instances of video content to the requesting entity.

7. The computer-implemented method of claim 6, wherein the textual query is projected into a joint-embedding space to determine the ranking based on a respective distance from the textual query to each of the plurality of instances of video content in the joint-embedding space, wherein an alignment module within the data model generates a matching score $m_{t,i}$ for each video frame $v_i$ at each time step t of the language LSTM neural network module, wherein the matching score represents how well a sequentially modeled sentence up to time t−1 and the video frame $v_i$ are semantically matched to one another.

8. The computer-implemented method of claim 7, wherein the matching score $m_{t,i}$ represents a determination of a relevance of the video frame $v_i$ and the language LSTM hidden state at the time t−1, wherein the matching score $m_{t,i}$ is defined as $m_{t,i}=\Phi(h_{t-1},v_i)$, and where $h_{t-1}$ represents the language LSTM hidden state at the time t−1 that contains information related to a sequentially modeled sentence up to the time t−1.

9. The computer-implemented method of claim 8, wherein identifying the ranking comprises:
  calculating a single value for matching score $m_{t,i}$ by taking a sum of states $h_{t-1}$ with each video-data $v_i$ to obtain a matching-vector and transforming the matching-vector to produce the matching score $m_{t,i}$;
  computing an attention weight $w_{t,i}$ for a video frame i of the instance of video content at a time t as $$w_{t,i} = \frac{\exp(m_{t,i})}{\sum_{j=1}^{T} \exp(m_{t,j})},$$

wherein the attention weight $w_{t,i}$ defines a soft-alignment between encoded sentences and video frames, such that a higher attention weight $w_{t,i}$ reflects more saliency attributes to a specific video frame i with respect to words in the sentence; and
  generating the attention-based representation, $k_t(A)$, by calculating a weighted average $k_t(A)$ of the video frames of the instance of video content using the computed attention weights $w_{t,i}$ where $k_t(A)=\Sigma_{i=1}^{T} w_{t,i} v_i$.

10. The computer-implemented method of claim 9, wherein each word within the plurality of phrases is encoded as a vector using Global Vectors for Word Representation (GloVe) analysis, wherein the trained model comprises a GloVe model, wherein the GloVe model is trained using distinct word tokens across distinct data sets, wherein the frame features are extracted using a pretrained spatial convolutional neural network, wherein the object classification analysis is performed on the extracted frame features using a deep convolutional neural network trained for object classification, wherein the deep convolutional neural network comprises a defined number of convolutional layers and a defined number of fully connected layers, followed by a softmax output layer;
  wherein based on the data model, a respective relevance of each video frame of the instance of video content is determined, wherein the last state, $h_{t-1}$, of the language LSTM neural network module is updated according to the following intermediate functions:

$$i_t=\sigma(W_i v_t+U_i h_{t-1}+b_i),$$

$$f_t=\sigma(W_f v_t+U_f h_{t-1}+b_f),$$

$$o_t=\sigma(W_o v_t+U_o h_{t-1}+b_o),$$

$$g_t=\tan h(W_c v_t+U_c h_{t-1}+b_c),$$

$$c_t = f_t c_{t-1} + i_t g_t,$$

$$h_t = o_t \tan h(c_t),$$

wherein $i_t$ represents an input gate, $f_t$ represents an forget gate, $o_t$ represents an output gate, and $c_t$ represents a cell gate of the language LSTM neural network module at a time t.

11. The computer-implemented method of claim 10, wherein each of the data model, the trained model, the pretrained spatial convolutional neural network, and the deep convolutional neural network comprises a distinct model, wherein a second one of the plurality of training samples is generated by sampling video content at a predefined interval, wherein each instance of video content comprises a respective video, wherein each phrase comprises a caption, wherein each word of each phrase is encoded as a respective word vector using the trained model for word representation;

wherein the ranking loss function comprises a pairwise ranking loss function given by:

$$\Sigma_{(c,v)}(\Sigma_{c'}\max\{0, \alpha - S(c,v) + S(c',v)\} + \Sigma_{v'}\max\{0, \alpha - S(c,v) + S(c,v')\})$$

where (c, v) represents a ground-truth pair of caption and video described by the caption, where c' represents contrastive captions not describing the video v, where v' represents contrastive videos not described by the caption c, where α represents a margin hyperparameter, and where S represents a similarity function;

wherein the similarity function includes the penalty function, which comprises a negative order-violation penalty, wherein the penalty function is given by:

$$S(c,v) = -E(v,c)$$

where E represents an asymmetric order-violation function given by:

$$E(x,y) = \|\max(0, y-x)\|^2$$

wherein the asymmetric order-violation function is configured to capture, regardless of caption length, relatedness of captions describing, at different levels of detail, a same video.

12. A system to query video content, the system comprising:
one or more computer processors;
a memory containing a program executable by the one or more computer processors to perform an operation comprising:
receiving, from a requesting entity, a textual query to be evaluated relative to a video library, the video library containing a plurality of instances of video content;
training a data model based on a plurality of training samples, wherein the data model comprises a soft-attention neural network module, a language Long Short-term Memory (LSTM) neural network module, and a video LSTM neural network module, which are jointly trained, wherein each of the plurality of training samples includes (i) a respective instance of video content and (ii) a respective plurality of phrases describing the respective instance of video content, wherein training the data model comprises, for each of the plurality of training samples:
encoding each of the plurality of phrases for the training sample as a matrix, wherein each word within the plurality of phrases is encoded as a vector using a trained model for word representation, wherein the trained model is separate from the data model;
determining a weighted ranking between the plurality of phrases, based on a respective length of each phrase, such that lengthier phrases are ranked above less lengthy phrases;
encoding the respective instance of video content for the training sample as a sequence of frames;
extracting frame features from the sequence of frames;
performing an object classification analysis on the extracted frame features; and
generating a matrix representing the respective instance of video content, based on the extracted frame features and the object classification analysis, the matrix including feature vectors;
processing the textual query using the trained data model to identify a ranking of the plurality of instances of video content responsive to the textual query, wherein the soft-attention neural network module aligns an output of a last state of the language LSTM neural network module with feature vectors of an instance of the plurality of instances of video content, wherein the ranking is identified by generating an attention-based representation that is fed to the video LSTM neural network module, wherein the attention-based representation is generated by calculating an attention-weighted average of frames of the instance of video content based on the aligned output and minimizing a ranking loss function having a penalty function that is asymmetric; and
returning at least an indication of the ranking of the plurality of instances of video content to the requesting entity.

13. The system of claim 12, wherein extracting the frame features from the sequence of frames is performed using a pretrained spatial convolutional neural network.

14. The system of claim 12, wherein the generated matrix representing the video is formed as $V = \{v_1, \ldots, v_M\} \in \mathbb{R}^{M \times d_v}$ of M video feature vectors, wherein each video feature vector has $d_v$ dimensions.

15. The system of claim 14, wherein the object classification analysis is performed on the extracted frame features using a deep convolutional neural network trained for object classification, wherein the deep convolutional neural network comprises a defined number of convolutional layers and a defined number of fully connected layers, followed by a softmax output layer.

16. The system of claim 12, wherein determining the weighted ranking between the plurality of phrases comprises:
determining, for each of the plurality of phrases, the respective length of the phrase.

17. The system of claim 12, wherein each word within the plurality of phrases is encoded as a vector using Global Vectors for Word Representation (GloVe) analysis, wherein the trained model comprises a GloVe model, wherein the GloVe model is trained using distinct word tokens across distinct data sets.

18. The system of claim 12, wherein the textual query is projected into a joint-embedding space to determine the ranking based on a respective distance from the textual query to each of the plurality of instances of video content in the joint-embedding space.

19. The system of claim 12, wherein the ranking loss function comprises a pairwise ranking loss function.

20. The system of claim 12, wherein the penalty function comprises a negative order-violation penalty.

* * * * *

UNITED STATES PATENT AND TRADEMARK OFFICE
CERTIFICATE OF CORRECTION

PATENT NO. : 11,409,791 B2
APPLICATION NO. : 15/620232
DATED : August 9, 2022
INVENTOR(S) : Atousa Torabi et al.

It is certified that error appears in the above-identified patent and that said Letters Patent is hereby corrected as shown below:

On the Title Page

On the page 2, in Column 2, item (56) under "Other Publications", Line 15, delete "MultimediaOctober" and insert -- Multimedia October --.

On the page 2, in Column 2, item (56) under "Other Publications", Line 42, delete "(AAAI15)." and insert -- (AAAI'15). --.

On the page 2, in Column 2, item (56) under "Other Publications", Line 46, delete "Kiras," and insert -- Kiros, --.

On the page 2, in Column 2, item (56) under "Other Publications", Line 59, delete "Weaklysupervised" and insert -- Weakly supervised --.

In the Drawings

On sheet 8 of 8, in Figure 7, and on the Title Page, the illustrative figure, reference numeral 745, Line 1, delete "form" and insert -- from --.

In the Specification

In Column 13, Line 4, delete "h($c_t$)," and insert -- h($c_t$). --.

In the Claims

In Column 17, Line 49, in Claim 6, after "module" delete "is".

Signed and Sealed this
Twenty-first Day of February, 2023

Katherine Kelly Vidal
*Director of the United States Patent and Trademark Office*